United States Patent
Johnson et al.

(10) Patent No.: US 10,310,256 B2
(45) Date of Patent: Jun. 4, 2019

(54) ABERRATION CORRECTION

(71) Applicant: Goodrich Corporation, Charlotte, NC (US)

(72) Inventors: James B. Johnson, Medford, MA (US); John Anthony Tejada, Londonderry, NH (US)

(73) Assignee: Goodrich Corporation, Charlotte, NC (US)

( * ) Notice: Subject to any disclaimer, the term of this patent is extended or adjusted under 35 U.S.C. 154(b) by 200 days.

(21) Appl. No.: 15/210,031

(22) Filed: Jul. 14, 2016

(65) Prior Publication Data

US 2018/0017787 A1 Jan. 18, 2018

(51) Int. Cl.
- G02B 23/04 (2006.01)
- G02B 27/00 (2006.01)
- G02B 27/10 (2006.01)

(52) U.S. Cl.
CPC ......... G02B 27/0025 (2013.01); G02B 23/04 (2013.01); G02B 27/1013 (2013.01)

(58) Field of Classification Search
CPC .. G02B 27/0025; G02B 27/14; G02B 13/146; G02B 17/08; G02B 2027/0145; G02B 27/106; H04N 5/2254; H04N 5/2258; H04N 5/332
USPC ........ 359/583, 618, 629, 637, 638, 639, 837
See application file for complete search history.

(56) References Cited

U.S. PATENT DOCUMENTS

| | | | |
|---|---|---|---|
| 5,136,417 A | 8/1992 | Smith | |
| 6,408,115 B1 | 6/2002 | McIntyre | |
| 7,136,220 B2 | 11/2006 | Ulrich et al. | |
| 2003/0072092 A1* | 4/2003 | Togino | G02B 27/0172 359/833 |
| 2003/0174315 A1* | 9/2003 | Byren | F41G 3/326 356/152.1 |
| 2004/0263955 A1* | 12/2004 | Ulrich | G02B 17/08 359/366 |
| 2006/0262406 A1* | 11/2006 | Wang | G02B 27/1073 359/618 |
| 2012/0080616 A1* | 4/2012 | Schoenborn | A61B 5/0059 250/459.1 |
| 2015/0253133 A1 | 9/2015 | Sisney et al. | |

* cited by examiner

*Primary Examiner* — Collin X Beatty
(74) *Attorney, Agent, or Firm* — Locke Lord LLP; Scott D. Wofsy; Joshua L. Jones

(57) ABSTRACT

A beamsplitter includes an optical substrate with a first surface configured to receive a beam of multi-spectral light, to reflect a first band of the multi-spectral light and to transmit a second band of the multi-spectral light through the optical substrate to be emitted from a second surface of the optical substrate opposite the first surface. The second surface is a freeform surface. A system includes a telescope configured to focus multi-spectral light into a beam. The system also includes a beamsplitter as described above optically coupled to the telescope so the first surface of the beamsplitter is configured to receive the beam of multi-spectral light from the telescope.

9 Claims, 2 Drawing Sheets

ABERRATION CORRECTION

BACKGROUND OF THE INVENTION

1. Field of the Invention

The present disclosure relates to optics and imaging devices, and more particularly to beamsplitters such as used in multi-spectral imagery.

2. Description of Related Art

There are many types of focusing telescopes that use primary, secondary (and sometime tertiary) mirrors to form an image over a broad spectral range. The on-axis configuration of these types of telescopes has a central obscuration with a spider that facilitates the secondary mounting arrangement. The reflective mirrors focus the energy through a beamsplitter which separates the spectrum into the paths for which each detector is sensitive. The parallel plate beamsplitter is used in large aperture systems because there are severe disadvantages with regard to weight, cost, material thickness and homogeneity that limit the use of a cubic beamsplitter configuration. However there are disadvantages to the parallel plate beamsplitter.

This component functions like a mirror for the path that is reflected. However, the light that is focused through the beamsplitter becomes aberrated. These aberrations can be minimized by applying a wedge to the surface of the beamsplitter, however, residual on-axis aberrations remain. The non-symmetric aberrations cannot be completely removed using rotationally symmetric imaging lenses farther down the optical path. Traditional alignment techniques would involve sequentially tilting and/or decentering optical components as they are installed into the optical channel to compensate for these residual aberrations.

Such conventional methods and systems have generally been considered satisfactory for their intended purpose. However, there is still a need in the art for improved aberration correction. The present disclosure provides a solution for this need.

SUMMARY OF THE INVENTION

A beamsplitter includes an optical substrate with a first surface configured to receive a beam of multi-spectral light, to reflect a first band of the multi-spectral light and to transmit a second band of the multi-spectral light through the optical substrate to be emitted from a second surface of the optical substrate opposite the first surface. The second surface is a freeform surface, e.g. has a freeform shape.

The freeform surface can be configured to mitigate aberration in the second band emitted from the second surface of the optical substrate. The freeform surface can be non-axiosymmetric. The first surface can be configured to reflect a first band of wavelengths within a range from long wave infrared (LWIR) to visible, inclusive, and to transmit a second band of wavelengths within a range from LWIR to visible, inclusive.

A system includes a telescope configured to focus multi-spectral light into a beam. The system also includes a beamsplitter as described above optically coupled to the telescope so the first surface of the beamsplitter is configured to receive the beam of multi-spectral light from the telescope.

The telescope can be a catadioptric telescope. A fold mirror can optically couple the telescope to the beamsplitter. A first imaging sensor can be optically coupled to receive the first band reflected from the beamsplitter, and a second imaging sensor can be optically coupled to receive the second band transmitted through the beamsplitter.

There can be a focus after the beamsplitter that is an intermediate image, wherein there are no non-axiosymmetric aberration components for correction between the beamsplitter and the second imaging sensor. The second imaging sensor can be sensitive in an infrared band. An image can be formed on the second imaging sensor, wherein the image is free of aberrations without the need to decenter or tilt rotationally symmetric optical correctors thereby making the aberrations in the second imaging sensor axially symmetric, e.g., the second imaging sensor can be free from non-axiosymmetric aberration components. The second imaging sensor can therefore be axially centered.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
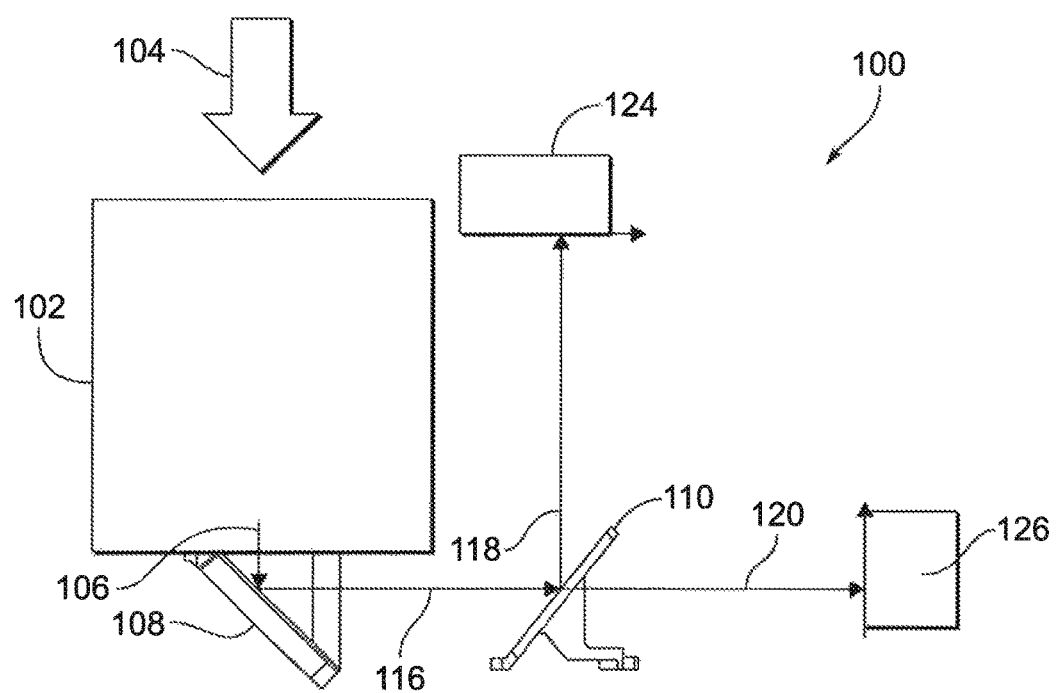
FIG. 1 is a schematic view of an exemplary embodiment of a system constructed in accordance with the present disclosure, showing a catadioptric telescope and beamsplitter.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to correct aberration from beamsplitters, e.g., in multi-spectral systems with catadioptric telescopes.

Figure 4:
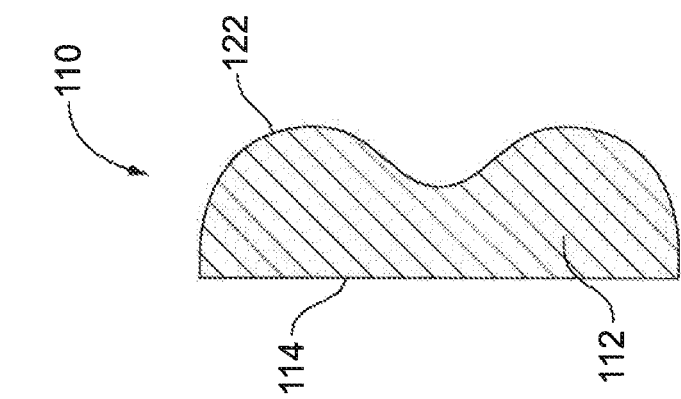
FIG. 4 is a schematic cross-sectional top plan view of the beamsplitter of FIG. 1, showing the freeform surface wherein the contouring is exaggerated for clarity.
Figure 3:
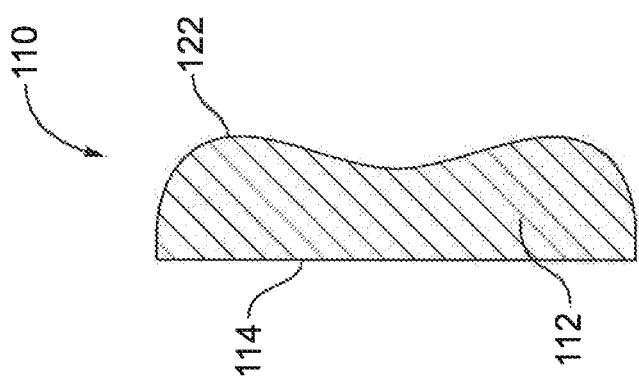
FIG. 3 is a schematic cross-sectional side elevation view of the beamsplitter of FIG. 1, showing the freeform surface wherein the contouring is exaggerated for clarity.
Figure 2:
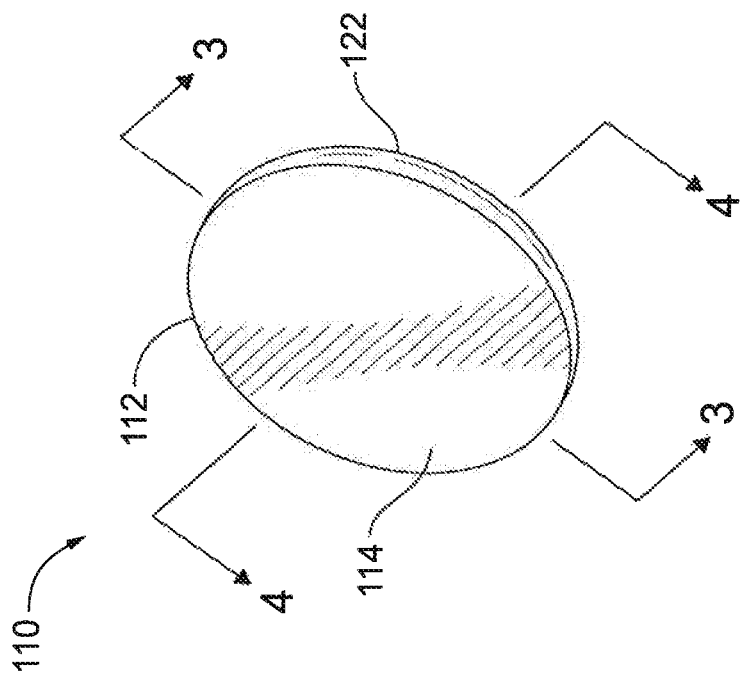
FIG. 2 is a perspective view of the beamsplitter of FIG. 1, showing the reflective surface.

System 100 includes a telescope 102 configured to focus multi-spectral light 104 into a beam 106. An optional fold mirror 108 optically couples the telescope 102 to a beamsplitter 110. Referring to FIG. 2, the beamsplitter 110 includes an optical substrate 112 with a first surface 114 configured to receive the beam of multi-spectral light 116 (shown in FIG. 1) from fold mirror 108, to reflect a first band, e.g., bandwidth of the beam of multi-spectral light 116, 118 (shown in FIG. 1) of the multi-spectral light and to transmit a second band 120 (shown in FIG. 1) of the multi-spectral light through the optical substrate 112 to be emitted from a second surface 122 of the optical substrate 112 opposite the first surface 114. The second surface 122 is a freeform surface, e.g., has a freeform shape contoured to correct for aberration from focusing effects on light passing through the optical substrate 112. As can be seen by comparing the cross-sections in FIGS. 3 and 4, the freeform surface, i.e. second surface 122, is non-axisymmetric. The freeform surface, i.e. second surface 122 in FIGS. 2-4, is configured to mitigate aberration in the second band 120 emitted from the second surface 122 of the optical substrate 110. Freeform surfaces in optics can be manufactured by other than standard spherical or aspheric manufacturing techniques and can include off-axis sections of rotationally symmetric parts, rotationally symmetric non-standard shapes, conformal optics that conform to the platform that they reside in, and other freeform geometries.

With reference again to FIG. 1, the telescope 102 is an on-axis obscured catadioptric telescope, and can focus multi-spectral light 104 for multiple imaging bands ranging from the visible to the long wave infrared (LWIR) spectrum. A first imaging sensor 124 is optically coupled to receive the first band 118 reflected from the beamsplitter 110, and a second imaging sensor 126 is optically coupled to receive the second band 120 transmitted through the beamsplitter 110. The first surface 114 of beam splitter 110 is configured to reflect the first band 118 of wavelengths within a range from long wave infrared (LWIR) to visible, inclusive, and to transmit the second band 120 of wavelengths within a range from LWIR to visible, inclusive.

The second imaging sensor 126 can be sensitive in an infrared band, for example. There can be a focus after the beamsplitter 110 in second band 120 that is an intermediate image, wherein there are no non-axisymmetric aberration components for correction between the beamsplitter 110 and the second imaging sensor 126. An image is formed on the second imaging sensor 126, wherein the image is free of aberrations. The second imaging sensor 126 can therefore be axially centered.

The residual aberrations of the transmitted path, e.g., second band 120, through the beamsplitter 110 can be eliminated by the freeform surface of beamsplitter 110. This can eliminate the need for tilting or decentering subsequent components for aberration compensation and facilitates the modular approach to the remaining optics in that path. Existing systems can potentially be retrofitted to include a beamsplitter as described above. The beamsplitters described herein facilitate making multi-band telescope systems modular due to the simplifications provided by correcting for aberration in the beamsplitter itself.

The methods and systems of the present disclosure, as described above and shown in the drawings, provide for aberration correction with superior properties including the facts that a beamsplitter can be used to direct energy into channels, a freeform surface on the back of the beamsplitter can be used to correct the residual aberrations caused by focusing through the beamsplitter, the aberration corrected image in an infrared channel can be viewed directly or by a detector or relayed using on-axis components, and by decoupling the aberrations of a telescope and relay optics, the paths can be built as stand-alone modules. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
a telescope configured to focus multi-spectral light into a beam; and
a beamsplitter optically coupled to the telescope, wherein the beamsplitter includes an optical substrate with a first surface configured to receive a beam of multi-spectral light from the telescope, to reflect a first band of the multi-spectral light and to transmit a second band of the multi-spectral light through the optical substrate to be emitted from a second surface of the optical substrate opposite the first surface, wherein the second surface is a freeform surface, further comprising a first imaging sensor optically coupled to receive the first band reflected from the beamsplitter, and a second imaging sensor optically coupled to receive the second band transmitted through the beamsplitter, wherein the telescope is a catadioptric telescope, and wherein there are no non-axiosymmetric aberration components for correction between the beamsplitter and the second image sensor.

2. A system as recited in claim 1, wherein the freeform surface is configured to mitigate aberration in the second band emitted from the second surface of the optical substrate.

3. A system as recited in claim 2, wherein the freeform surface is non-axiosymmetric.

4. A system as recited in claim 1, wherein the first surface is configured to reflect a first band of wavelengths within a range from long wave infrared (LWIR) to visible, inclusive, and to transmit a second band of wavelengths within a range from LWIR to visible, inclusive.

5. A system as recited in claim 1, further comprising a fold mirror optically coupling the telescope to the beamsplitter.

6. A system as recited in claim 1, wherein there is a focus after the beamsplitter that is an intermediate image, wherein there are no off-axis components for aberration correction between the beamsplitter and the second imaging sensor.

7. A system as recited in claim 1, wherein the second imaging sensor is sensitive in an infrared band.

8. A system as recited in claim 1, wherein an image is formed on the second imaging sensor, wherein the image is free of aberrations.

9. A system as recited in claim 1, wherein the second imaging sensor is free from non-axiosymmetric aberration components.

* * * * *